United States Patent Office 3,303,065
Patented Feb. 7, 1967

3,303,065

SUPERCONDUCTIVE ALLOY MEMBERS

William T. Reynolds, Peters Township, Canonsburg, Pa., assignor to Westinghouse Electric Corporation, East Pittsburgh, Pa., a corporation of Pennsylvania No Drawing. Filed Apr. 30, 1964, Ser. No. 364,004
9 Claims. (Cl. 148—32)

This invention is directed to a ternary superconductive alloy strip or wire conductors having a high critical field and a high critical supercurrent density in a strong applied magnetic field.

The phenomenon of superconductivity at cryogenic temperatures has been known for many years, but it is only recently that practical application of the phenomenon has become feasible. One such application is the fabrication of electromagnetic coils or solenoids from superconductive wire or strip for the development of high magnetic fields. A substantial degree of success has already been achieved with such electromagnetic coils, and magnetic fields in excess of 50,000 gauss have been developed.

In producing superconductive magnetic coils, the phenomenon of superconductivity in certain metals and alloys is relied upon. Briefly, as a coil of the wire of the metal is cooled there is reached a point, usually within several degrees of absolute zero (such point being specific to the particular metal or alloy, and known as the "critical temperature") at which the metal loses its normal resistance to the flow of electrical current and a small electrical current will flow in the coil more or less indefinitely, and the metal is in what is called the superconducting state. This property of superconductivity is maintained at temperatures below the critical temperature and disappears above the critical temperature. The amount of electrical current that the conductor can carry in the superconductive state has a maximum, known as the "critical supercurrent density" or $J_c$, which if exceeded causes the conductor to lose its superconducting properties. Further, a wire or coil in the superconductive state is affected by a magnetic field either self-induced or externally applied, which if of high enough intensity will cause the conductor to lose its superconductive properties, such magnetic field being designated the "critical field" or $H_c$. The maximum supercurrent density is dependent on the magnetic field to which the conductor is subjected. At magnetic fields of values less than the "critical field," the conductor can carry only a certain maximum supercurrent density and it has been observed that invariably the maximum supercurrent density increases with lower magnetic flux density on the conductor.

Many of the electromagnetic coils of high quality which have been made have been wound from niobium-zirconium alloy wire. However, binary niobium-zirconium alloys have a maximum critical supercurrent density of up to about $1\times10^5$ amp/cm.$^2$ or slightly higher in an applied field of 20 kilogauss in the cold worked condition.

Accordingly, it is the object of the invention to provide a cold worked superconductive ternary alloy conductor having a relatively high critical field and a high critical supercurrent density in a strong applied magnetic field.

It is a further object of the invention to provide a heat treated superconductive ternary alloy conductor having improved critical supercurrent density.

Other objects and advantages of the invention will, in part, be obvious and will, in part, appear hereinafter.

The invention broadly comprises a superconductive alloy conductor composed of from about 10% to 75% by weight of zirconium, from 0.5% to 10% molybdenum, and the balance essentially niobium; the conductor having been subjected to a cold reduction of at least 96%. Such an alloy superconductor will have a relatively high critical field and a critical supercurrent density superior to the binary niobium-zirconium alloys.

One improved group of alloy conductors of the broad class defined above contains from 20 to 30% and preferably about 25% by weight of zirconium, from 0.5% to 10% by weight of molybdenum and the balance essentially niobium; the conductor having been subjected to a cold reduction of at least 98%.

More specifically, an improved alloy superconductor of the invention is composed of about 25% by weight of zirconium, about 1% by weight of molybdenum and the balance essentially niobium; the conductor having been subjected to a cold reduction of at least 99%. A superconductor of this specific composition which has been prepared with 99% of cold reduction exhibits a critical supercurrent density in excess of $2\times10^5$ amp/cm.$^2$ in an applied field of 20 kilogauss.

Another improved superconductive alloy conductor of this invention is composed of, by weight, about 50% zirconium, from 0.5% to 10% molybdenum, the balance essentially niobium except for small amounts of impurities, the conductor having been subjected to a cold reduction of at least 98%.

Still another improved superconductive alloy conductor of the invention is composed of, by weight, about 70% zirconium, from 0.5% to 10% molybdenum, the balance essentially niobium except for small amounts of impurities, the conductor having been subjected to a cold reduction of at least 98%.

The critical supercurrent densities of the alloys of this invention can be improved by a heat treatment at a temperature above about 600° C. The time at temperature may range from 15 minutes to 4 hours.

The following is an example illustrating the practice of the invention:

*Example*

A weighed charge of electron-beam melted niobium, crystal bar zirconium and sintered molybdenum was arc melted in a non-consumable electrode furnace under a partial atmosphere of mixed argon and helium. The three constituents were present in such amounts as to yield an alloy having the nominal composition, 25% by weight zirconium, 1% by weight molybdenum and the balance essentially niobium. The charge was inverted and melted four times to obtain a thoroughly alloyed material. The ingot was then homogenized in a vacuum-induction furnace for 16 hours at about 1800° C. A sample of the ingot, which was 0.450" thick, was cold rolled to strips 0.0015" thick. Samples of strip were taken during the rolling process at 0.010", 0.006", 0.003" and 0.001" thickness. Specimens for determination of critical supercurrent density were electrodischarge machined from strip samples. The results obtained in testing the alloy strip were as follows:

TABLE I

| Sample No. | Cold Work, Percent Reduction in Thickness | Applied Field (Kilogauss) | Critical Supercurrent Density, $J_c$ amp/cm.$^2\times10^5$ | Upper Critical Field, $H_c$ (Kilogauss) |
|---|---|---|---|---|
| 1 | 98.640 (.006" thick) | 5 | 1.27 | |
| | | 10 | 1.59 | |
| | | 15 | 1.70 | |
| | | 20 | 1.64 | |
| 2 | 99.333 (.003" thick) | 5 | 1.82 | 80±4 |
| | | 10 | 2.17 | |
| | | 15 | 2.38 | |
| | | 20 | 2.34 | |
| 3 | 99.640 (.0015" thick) | 5 | 1.63 | |
| | | 10 | 1.36 | |
| | | 15 | 1.07 | |
| | | 20 | 0.98 | |

It will be noted from the above table that with the strip which had been cold worked to a reduction of 99.333% a very high current density of more than $2\times10^5$ amp/cm.$^2$ was obtained in an applied field of 20 kilogauss, a value far better than that obtainable with the known binary niobium-zirconium alloys. This sample also exhibits a relatively high critical field, about 80 kilogauss. This value for critical field of about 80 kilogauss is applicable to all of the samples of Table 1 since cold working does not affect the critical field. Curiously, in Samples 1 and 2 the critical supercurrent density increases substantially with increasing applied field; the critical supercurrent densities at applied fields of 15 and 20 kilogauss being higher than the supercurrent densities at applied fields of 5 or 10 kilogauss. This is the opposite of the effect of applied field observed in all other superconductive alloys, and this phenomenon is not fully understood. However, this unusual effect does not occur in Sample 3.

Strips 0.006, 0.003 and 0.001 inch thickness, with reductions of over 98% of an alloy (a) of 50% zirconium, 1% molybdenum, balance niobium and (b) 70% zirconium, 1% molybdenum, balance niobium were also prepared. Their ductility is better than that of the alloy of Example I.

It was found that in the as-rolled condition, the critical current density of the 50% zirconium, 1% molybdenum, balance niobium alloy strip is about $6\times10^4$ amp/cm.$^2$ in an applied field of 20 kilogauss. In contrast, the 50% zirconium, balance niobium alloy strip in the as-rolled condition has a critical current density of only about $1\times10^4$ amp/cm.$^2$ in an applied field of the same strength.

A similar effect of the molybdenum addition is noted, although at a lower level of critical current density, when the properties of the 70% zirconium, 1% molybdenum, balance niobium alloy strip are compared with those of the 70% zirconium, balance niobium alloy strip. In this case, the cold worked alloy strip containing molybdenum has a critical current density of more than $6\times10^3$ amp/cm.$^2$ in an applied field of 20 kilogauss, while the binary 70% zirconium-niobium alloy strip has a critical current density of only about $4\times10^3$ amp/cm.2 in a field of the same strength.

Since substantial improvements result from the heat treatment of cold worked superconductors strip in some cases, the effect of heat treatment on the alloy conductors of this invention was explored. The following table sets forth the results of the heat treatment on the cold worked superconductive alloy having the nominal composition 25% by weight zirconium, 1% by weight molybdenum and the balance essentially niobium.

TABLE II

| Cold Work Percent Reduction in Thickness | Vacuum Heat Treatment | | Applied Field, Kilogauss | Critical Super-Current Density, $J_c$ |
|---|---|---|---|---|
| | Time (hrs.) | Temp., ° C. | | amp/cm.$^2\times10^5$ |
| 99.356 | 1 | 400 | 5 | 1.58 |
| | | | 10 | 1.89 |
| | | | 15 | 1.92 |
| | | | 20 | 1.82 |
| 99.333 | 1 | 500 | 5 | 1.69 |
| | | | 10 | 1.95 |
| | | | 15 | 2.02 |
| | | | 20 | 1.76 |
| 99.333 | 1 | 600 | 5 | 3.07 |
| | | | 10 | 2.89 |
| | | | 15 | 2.61 |
| | | | 20 | 2.41 |
| 99.289 | 1 | 700 | 5 | 3.92 |
| | | | 10 | 3.88 |
| | | | 15 | 3.80 |
| | | | 20 | 3.51 |
| 99.356 | 1 | 800 | 5 | 3.48 |
| | | | 10 | 3.19 |
| | | | 15 | 2.44 |
| | | | 20 | 2.41 |

Comparison of the properties obtained after heat treating with the properties of the unheat treated cold worked alloy reveals that heat treatment at relatively low temperatures of 400 and 500° C. somewhat lowers the critical supercurrent density. Heat treatment at higher temperatures of from about 600° C. to about 800° C. improves the supercurrent density. The improvement in critical supercurrent density brought about by a heat treatment at 700° C. is particularly notable.

The heat treatment of the ternary molybdenum-containing alloy strip at the zirconium levels of 25% and 50% produces critical current density characteristics which are essentially equivalent to the results obtained with the heat treated binary alloy strip at these same zirconium levels. At the 70% zirconium level, the heat treated ternary alloy strip containing 1% molybdenum yields substantially higher critical current densities than the heat-treated binary alloy strip.

It should be understood that alloy superconductors of this invention are quite satisfactory for application in many superconductive devices in the cold worked condition, and the additional expense of heat treatment need not be incurred. However, as indicated, even higher critical supercurrent densities are available upon heat treatment. Heat treatment does reduce the critical field by about 20%. The critical supercurrent density increases with increased severity of cold working at least up to about 99.5% cold reduction. Generally at least 96.0% cold reduction will be required to give a useful level of supercurrent density. For better results at least 98% reduction is necessary, and still higher supercurrent density is attained when cold work exceeds 99% reduction.

The raw materials used in the production of these superconductors are of high purity so that the total amount of impurities in the alloys is estimated to be not in excess of 0.03% by weight.

The ternary niobium-zirconium-molybdenum alloy superconductors in accordance with this invention are thus substantially superior in critical supercurrent density to the binary niobium-zirconium alloys presently in use. From the foregoing disclosure and data, it is evident that the present invention provides superconductive materials having properties which are highly useful in superconductive applications.

The inventive principles embodied in the above description may obviously be incorporated in modified processes by those skilled in the art without departing from the spirit and scope of this invention, and it is intended that the description be interpreted as illustrative and not in a limiting sense.

I claim as my invention:

1. A superconductive alloy conductor which has been subjected to a cold reduction of at least 96%, said conductor exhibiting under superconductive conditions a relatively high critical field and improved critical supercurrent density in a strong applied magnetic field, said alloy conductor composed of from about 10% to 75% by weight of zirconium, from 0.5% to 10% molybdenum and the balance niobium except for trace amounts of impurities.

2. The conductor of claim 1 which has been subjected to heat treatment at a temperature above about 600° C.

3. A superconductive alloy conductor which has been subjected to a cold reduction of at least 98%, said conductor exhibiting under superconductive conditions a relatively high critical field and improved critical supercurrent density in a strong applied magnetic field, said alloy conductor composed of about 25% by weight of zirconium, from 0.5% to 10% by weight of molybdenum and the balance niobium except for trace amounts of impurities.

4. The conductor of claim 3 which has been subjected to heat treatment at a temperature above about 600° C.

5. A superconductive alloy conductor which has been subjected to a cold reduction of over 99%, said conductor exhibiting under superconductive conditions a relatively high critical field and a critical supercurrent density in excess of $2 \times 10^5$ amp./cm.$^2$ in an applied field of 20 kilogauss, said alloy conductor composed of about 25% by weight of zirconium, about 1% by weight of molybdenum and the balance niobium except for trace amounts of impurities, the critical supercurrent density being higher in an external applied field of 15 to 20 kilogauss than in a field at a level of 5 to 10 kilogauss.

6. A superconductive alloy conductor which has been subjected to a cold reduction of at least 98%, said conductor exhibiting under superconductive conditions a relatively high critical field and improved critical supercurrent density in a strong applied magnetic field, said alloy conductor composed of about 50% by weight of zirconium, from 0.5% to 10% by weight of molybdenum and the balance niobium except for trace amounts of impurities.

7. The conductor of claim 6 which has been subjected to heat treatment at a temperature above about 600° C.

8. A superconductive alloy conductor which has been subjected to a cold reduction of at least 98%, said conductor exhibiting under superconductive conditions a relatively high critical field and improved critical supercurrent density in a strong applied magnetic field, said alloy conductor composed of about 70% by weight of zirconium, from 0.5% to 10% by weight of molybdenum and the balance niobium except for trace amounts of impurities.

9. The conductor of claim 8 which has been subjected to heat treatment at a temperature above about 600° C.

References Cited by the Examiner

UNITED STATES PATENTS 3,215,569 11/1965 Kneip et al. --------- 75—174

FOREIGN PATENTS 1,099,178 2/1961 Germany.

References Cited by the Applicant

FOREIGN PATENTS 615,863 1962 Belgium.
617,739 1962 Belgium.
623,046 1962 Belgium.

HYLAND BIZOT, *Primary Examiner.*

DAVID L. RECK, C. N. LOVELL, *Assistant Examiners.*